United States Patent
Sprague et al.

(10) Patent No.: US 8,475,139 B2
(45) Date of Patent: Jul. 2, 2013

(54) METHOD AND APPARATUS FOR A JET PUMP SLIP JOINT INTERNAL SEAL

(75) Inventors: Robin D. Sprague, Wilmington, NC (US); Lee J. Andre, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 350 days.

(21) Appl. No.: 12/876,567

(22) Filed: Sep. 7, 2010

(65) Prior Publication Data

US 2012/0057992 A1   Mar. 8, 2012

(51) Int. Cl.
*F04F 5/44* (2006.01)
*F16L 21/00* (2006.01)

(52) U.S. Cl.
USPC ........... 417/151; 285/374; 285/917; 277/644; 277/603

(58) Field of Classification Search
USPC .............. 277/644, 684, 603; 285/374, 363, 285/364, 365, 366, 377, 368, 112, 917, 349, 285/379; 417/151
See application file for complete search history.

(56) References Cited

U.S. PATENT DOCUMENTS

| | | | |
|---|---|---|---|
| 3,012,802 A * | 12/1961 | Waite | 277/608 |
| 3,378,456 A * | 4/1968 | Roberts | 376/407 |
| 3,595,588 A * | 7/1971 | Rode | 277/650 |
| 3,761,102 A * | 9/1973 | Nicholson | 277/647 |
| 4,285,770 A * | 8/1981 | Chi et al. | 376/407 |
| 4,361,335 A * | 11/1982 | Vinciguerra | 277/633 |
| 4,495,138 A * | 1/1985 | Thevenin et al. | 376/203 |
| 4,602,795 A * | 7/1986 | Lillibridge | 277/644 |
| 4,854,600 A * | 8/1989 | Halling et al. | 277/626 |
| 6,438,192 B1 * | 8/2002 | Erbes et al. | 376/372 |
| 6,587,535 B1 * | 7/2003 | Erbes et al. | 376/260 |
| 6,932,353 B2 * | 8/2005 | Amos et al. | 277/602 |
| 6,942,220 B2 * | 9/2005 | Takahiro et al. | 277/603 |
| 7,073,796 B2 * | 7/2006 | Tanioka et al. | 277/626 |
| 2008/0029969 A1 * | 2/2008 | Torres | 277/434 |
| 2008/0031741 A1 * | 2/2008 | Torres | 417/151 |
| 2011/0069804 A1 * | 3/2011 | Lynch | 376/372 |

* cited by examiner

*Primary Examiner* — Charles Freay
*Assistant Examiner* — Nathan Zollinger
(74) *Attorney, Agent, or Firm* — Harness, Dickey & Pierce, P.L.C.

(57) ABSTRACT

A method and apparatus for a Boiling Water Reactor (BWR) jet pump slip joint internal seal for an interface between an inlet mixer and a diffuser of a jet pump assembly. The internal seal effectively mitigates leakage and slip joint flow induced vibration (FIV) between the inlet mixer and diffuser to reduce damage to many of the jet pump assembly components. A metallic seal of the slip joint internal seal flares out to conform the internal seal to a range of gap sizes, and compresses or springs back to nominal dimensions as thermal expansion and contraction occurs. The internal seal is self-expanding/self-tightening, as the internal seal flares further outward as a result of the internal pressure caused by flowing fluids in an operating jet pump assembly.

17 Claims, 6 Drawing Sheets

METHOD AND APPARATUS FOR A JET PUMP SLIP JOINT INTERNAL SEAL

BACKGROUND OF THE INVENTION

1. Field of the Invention

Example embodiments relate generally to nuclear reactors, and more particularly to a method and apparatus for a Boiling Water Reactor (BWR) jet pump slip joint internal seal used to provide an effective means of sealing the joint between an inlet mixer and a diffuser of a BWR jet pump assembly.

2. Related Art

A reactor pressure vessel (RPV) of a boiling water reactor (BWR) typically has a generally cylindrical shape and is closed at both ends (for example by a bottom head and a removable top head). A top guide typically is spaced above a core plate within the RPV. A core shroud, or shroud, typically surrounds the core and is supported by a shroud support structure. Particularly, the shroud has a generally cylindrical shape and surrounds both the core plate and the top guide. There is a space or annulus between the cylindrical reactor pressure vessel and the cylindrically shaped shroud.

In a BWR, hollow tubular jet pumps positioned within the shroud annulus provide the required reactor core water flow. The upper portion of the jet pump, known as the inlet mixer, is laterally positioned and may be supported by conventional jet pump restrainer brackets. While conventional jet pump restrainer brackets may provide system stiffness that mitigates vibration of system components, slip joint flow induced vibration (FIV) and leakage may still occur between the inlet mixers and the diffusers. In particular, slip joint FIV is the root cause of the major damage to many of the jet pump components in a BWR. Furthermore, insertion and stabilization of the inlet mixers within the diffusers may cause the inlet mixers to remain slightly off-center within the diffuser, causing further slip joint FIV and leakage.

Conventionally, many attempts have been made to reduce slip joint FIV. For instance, slip joint clamps, auxiliary wedges at the set screws of restrainer brackets, labyrinth seals, restrainer bracket pad repair, and replacement main wedges have all been used. These efforts generally involve either clamping the inlet mixer to the diffuser, or constraining the inlet mixer to the riser pipe via the restrainer bracket. While these conventional solutions have provided some additional system stiffness, none of the solutions address actual leakage between the inlet mixers and diffusers. Therefore, none of the conventional solutions prevent the main vibration forcing function involved in slip joint FIV from occurring.

SUMMARY OF INVENTION

Example embodiments provide a method and an apparatus for sealing a slip joint of a BWR jet pump assembly. Example embodiments provide a self-expandable/self-tightening slip joint internal seal that provides a seal between the lower distal end of an inlet mixer and a top portion of a diffuser of the BWR jet pump assembly. In some BWR jet pump assemblies, the slip joint internal seal may be located on an existing internal step toward the top of the diffuser such that no machining is required, whereas other BWR jet pump assembly diffusers may require machining in order to house the slip joint internal seal. The slip joint internal seal may prevent both leakage and flow induced vibration between the mating surfaces of the inlet mixer and the diffuser.

BRIEF DESCRIPTION OF THE DRAWINGS

The above and other features and advantages of example embodiments will become more apparent by describing in detail, example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Figure 1:
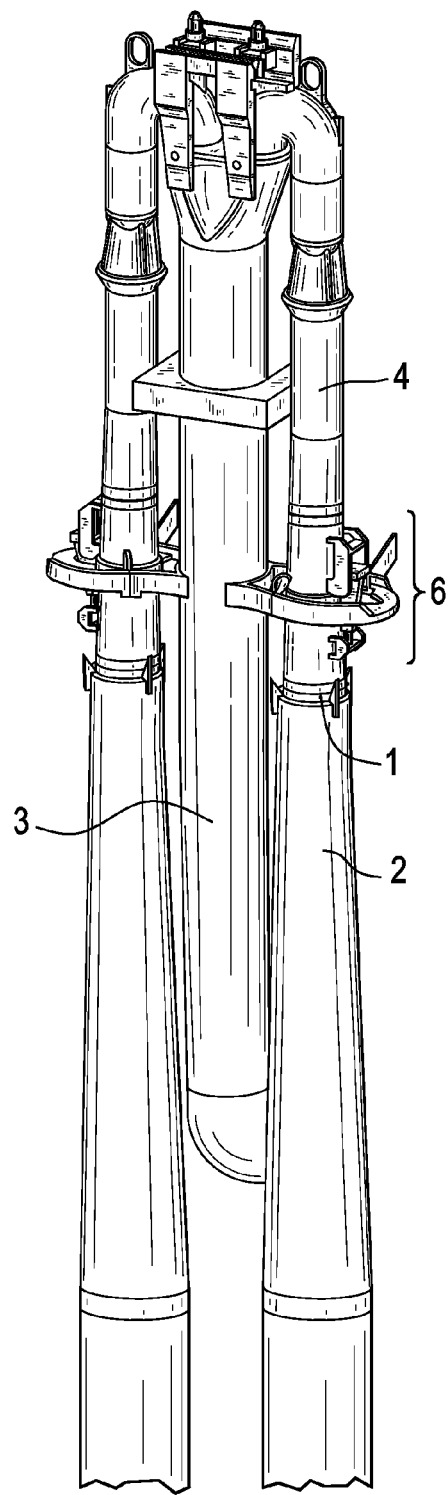
FIG. 1 is a perspective view of a conventional boiling water nuclear reactor (BWR) jet pump assembly.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 is a perspective view of a conventional nuclear boiling water reactor (BWR) jet pump assembly. The major components of the jet pump assembly include a riser pipe 3, two inlet mixers 4 that insert into respective diffusers 2. Conventionally, jet pump restrainer brackets 6 are used to stabilize movement of the inlet mixers and reduce movement (i.e., slip joint Flow Induced Vibration, or FIV) and leakage of the slip joint 1 that exists at the interface between the inlet mixers 4 and the diffusers 2.

Figure 2:
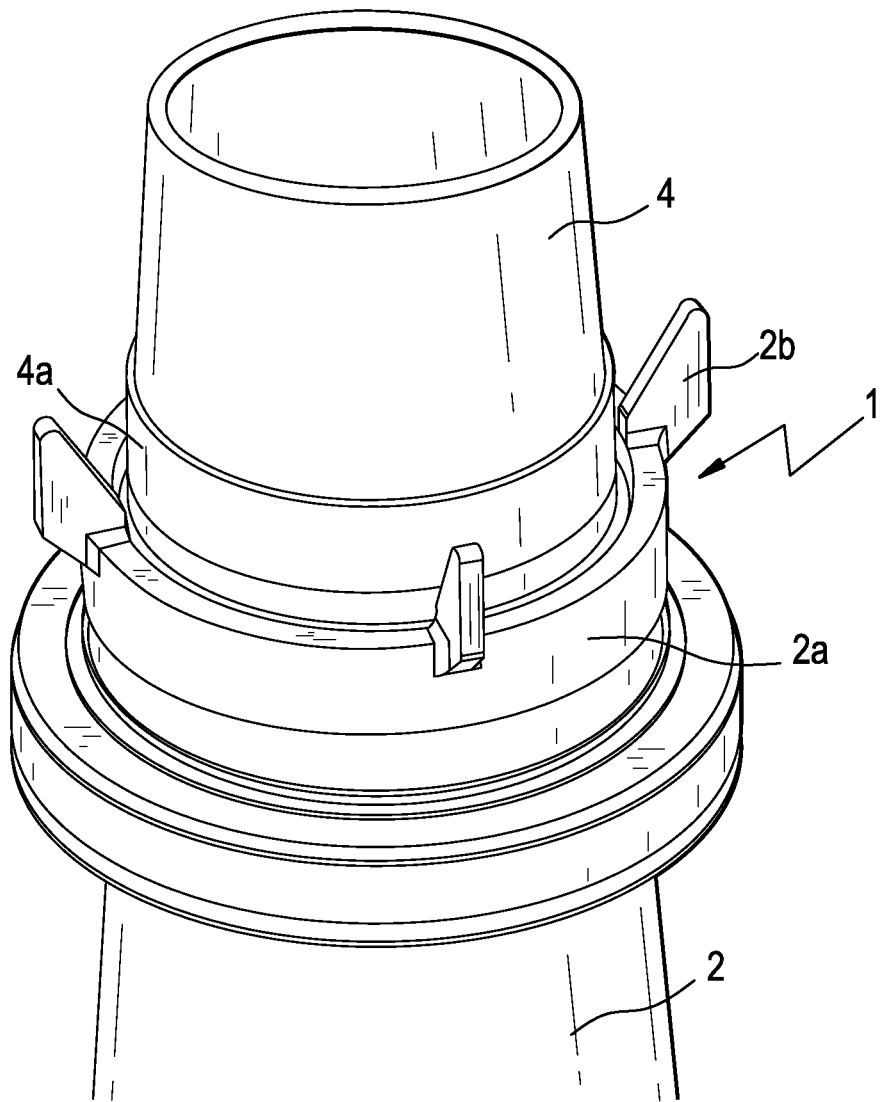
FIG. 2 is a detailed view of a conventional slip joint that exists between an inlet mixer and a diffuser of a BWR jet pump assembly.

FIG. 2 is a detailed view of a conventional slip joint that exists between an inlet mixer and a diffuser of a BWR jet pump assembly. It should be noted that the bottom portion 4a of the inlet mixer 4 inserts into the upper crown 2a of the diffuser 2 (which also includes guide ears 2b). The interface between the inlet mixer 4 and the diffuser 2 is referred to as a "slip joint" 1.

Figure 3:
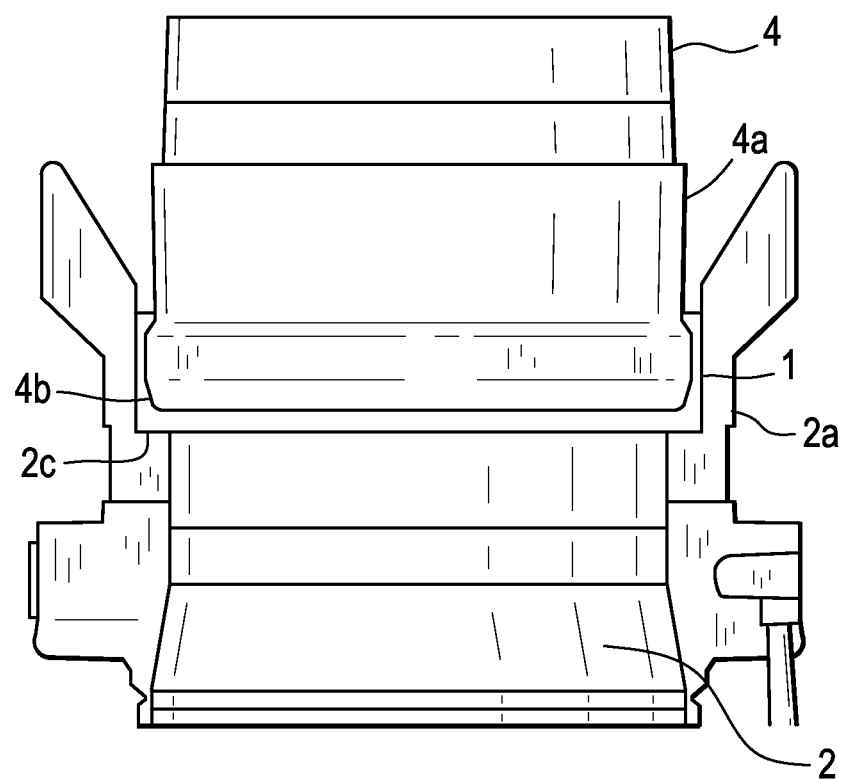
FIG. 3 is a cross-sectional view of a conventional slip joint that exists between an inlet mixer and a diffuser of a BWR jet pump assembly.

FIG. 3 is a cross-sectional view of a conventional slip joint that exists between an inlet mixer and a diffuser of a BWR jet pump assembly. The lowest distal end 4b of inlet mixer 4 rests in the upper crown 2a of diffuser 2, to form slip joint 1. Conventionally, leakage and slip joint FIV may occur in the slip joint 1 when tolerances between the distal end 4b of the inlet mixer 4 and the upper crown 2a of diffuser 2 do not exactly match. In this figure, the lowest distal end 4b of inlet mixer 4 is shown located above internal step 2c of diffuser 2, with a slight clearance between the distal end 4b and internal step 2c. However, it should be understood that not all conventional diffusers 2 have such an internal step 2c (i.e., in some cases the distal end 4b of the inlet mixer merely rests inside the upper crown 2a of diffuser 2 via tight tolerances in the diameters of inlet mixer 4 and diffuser 2).

Figure 4:
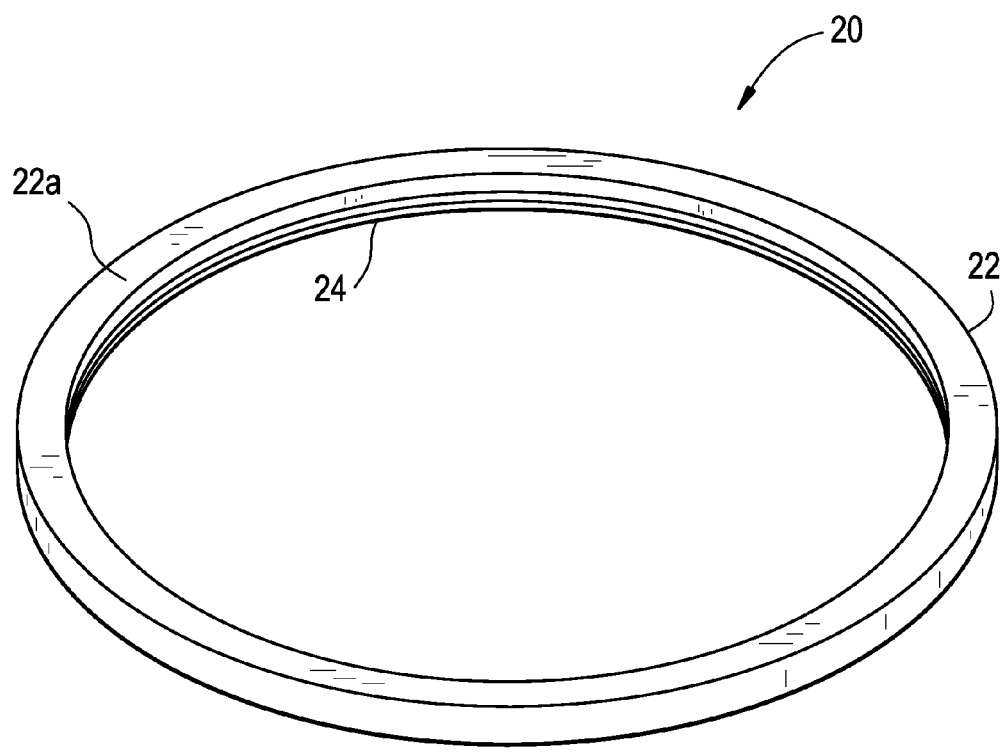
FIG. 4 is a jet pump slip joint internal seal, in accordance with example embodiments.

FIG. 4 is a jet pump slip joint internal seal 20, in accordance with example embodiments. The embodiment includes a substantially circular flexible metallic seal 24 contained in a substantially circular seal mounting ring 22. To some extent, the flexible metallic seal 24 is held in place in the seal mounting ring 22 by an upper portion 22a of the seal mounting ring, which provides an overhang that contains the flexible metallic seal 24 (shown with more clarity in FIGS. 5-6).

Figure 5:
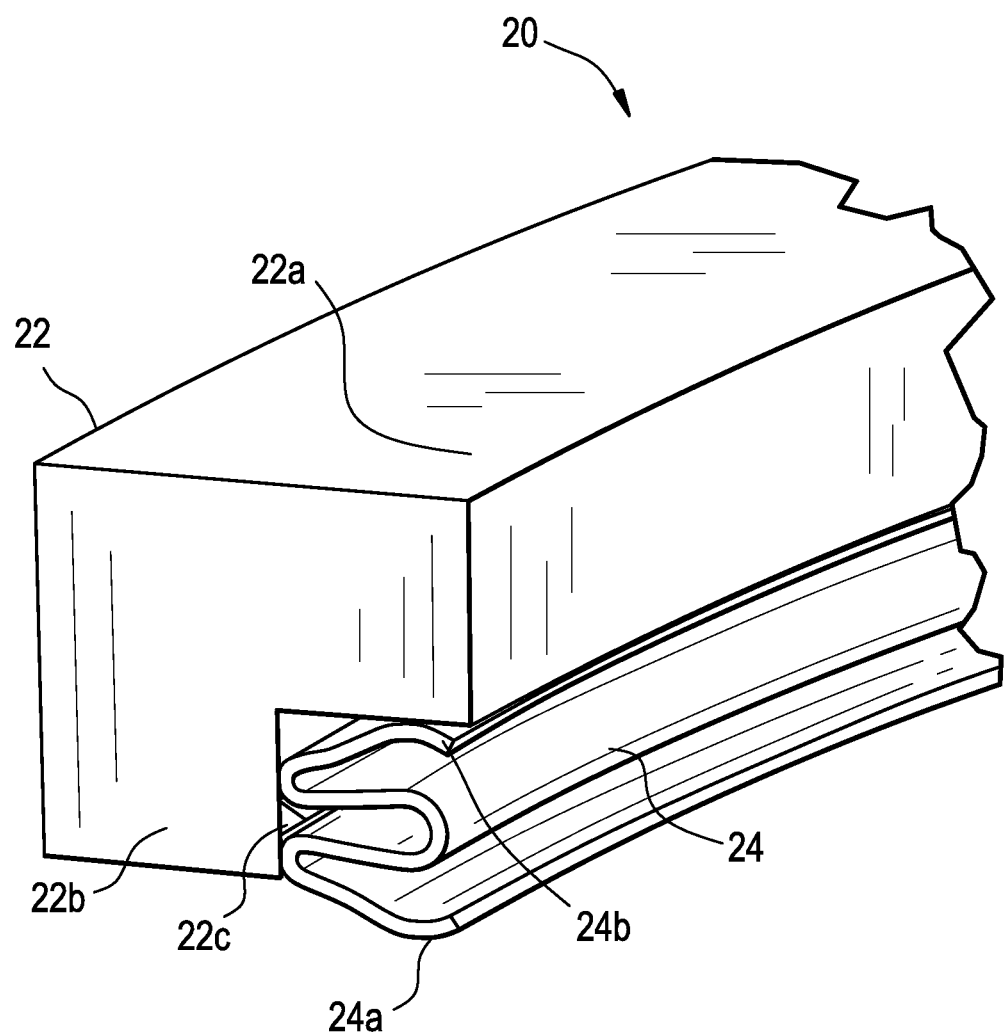
FIG. 5 is a cross-sectional view of a jet pump slip joint internal seal, in accordance with example embodiments.

FIG. 5 is a cross-sectional view of a jet pump slip joint internal seal 20, in accordance with example embodiments. The seal 20 includes an upper portion 22a that projects toward a center of the internal seal 20 to provide an overhanging structure that assists in housing the flexible metallic seal 24. The seal mounting ring 22 also includes a lower portion 22b that projects downward to contain the flexible metallic seal 24 in the seal mounting ring 22. The flexible metallic seal 24 may be an E-ring (i.e., the cross-section of the flexible metallic seal 24 may be in the shape of an "E") with an upper lip 24b that projects toward a center of internal seal 20 and contacts a lower surface of the upper portion 22a of the seal mounting ring 22. The flexible metallic seal 24 may also have a lower lip 24a that projects toward a center of internal seal 20 and extends below a lower surface of the lower portion 22b of the seal mounting ring 22 (i.e., the lower lip 24a of the flexible metallic seal 24 is purposefully located below the seal mounting ring 22 itself). Resiliency in the flexible metallic seal 24 causes the lower and upper lips 24a/24b to flare outwardly to allow the flexible metallic seal to then conform to a range of gap sizes (as shown with more clarity in FIG. 6), and may be compressed or spring back to nominal dimensions as thermal expansion and contraction occurs throughout service. The flexible metallic seal 24 may be held within seal mounting ring 22 via friction fitting. However, optionally an inwardly projecting tooth 22c may be located on the inner surface of lower portion 22b to engage the E-shaped flexible metallic seal 24 to assist in holding the flexible metallic seal 24 in place in the seal mounting ring 22.

It should be noted that rather than an E-ring (as shown in FIG. 5), the flexible metallic seal may instead be a C-ring (i.e., the cross-section may form a "C" shape). If a C-ring is used, a tooth may be formed on the surface of the C-shaped flexible metallic seal which may mate with a recessed cavity on an inner surface of the lower portion 22b of seal mounting ring 22. Additionally, while FIG. 5 depicts a flexible metallic seal 24 and a seal mounting ring 22 shown as separate components, the flexible metallic seal 24 and the seal mounting ring 22 may instead be one integral piece.

The flexible metallic seal 24 may be constructed from high tensile strength alloy such as Alloy 718 or Alloy X-750, particularly when using an "E"-shaped configuration. Austenitic stainless steel may also be used particularly when using a "C"-shaped configuration. However, no limitation exists in constructing the metallic seal 24 from resilient non-metallic materials. The seal mounting ring 22 may be constructed from austenitic stainless steel. However, no limitation exists in constructing seal mounting ring 22 from resilient metallic and non-metallic materials.

Figure 6:
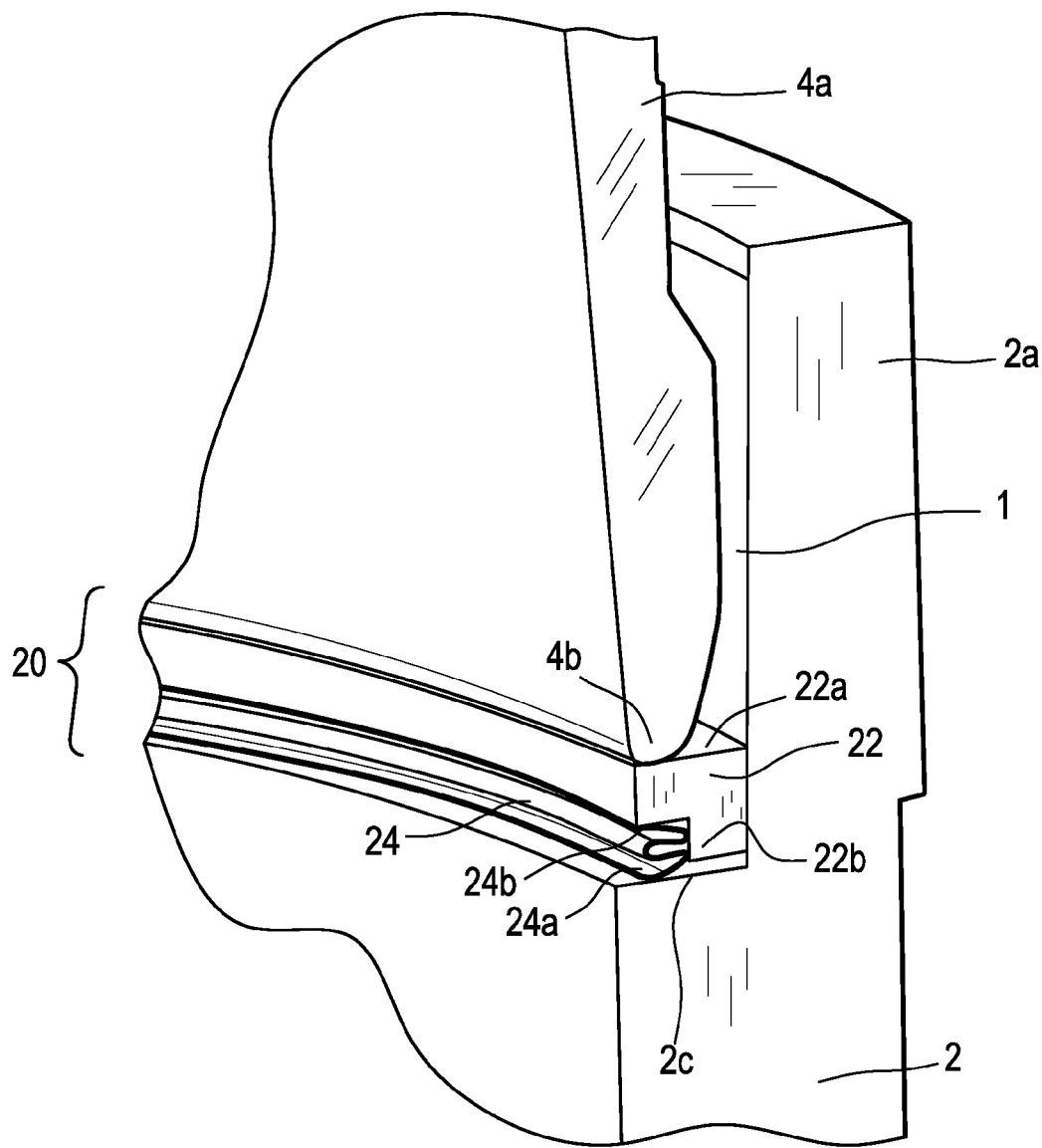
FIG. 6 is a cut-away view of a jet pump slip joint internal seal installed in a slip joint, in accordance with example embodiments.

FIG. 6 is a cut-away view of a jet pump slip joint internal seal 20 installed in a slip joint 1, in accordance with example embodiments. Note that the internal seal 20 may be located on an internal step 2c of diffuser 2, if such a step already exists in the diffuser 2. If such a step 2c does not exist, machining may be performed on the diffuser 2 to then form a step 2c. The internal seal 20 may prevent leakage between inlet mixer 4 and diffuser 2 by allowing the lowest distal end 4b of inlet mixer 4 to contact the upper portion 22a of seal mounting ring 22. Therefore, the diameter of the upper portion 22a must extend inward at least far enough that the upper portion 22a may contact the distal end 4b of the diffuser so that the distal end 4b of the diffuser may rest on the upper surface of upper portion 22a. The diameter of the seal mounting ring 22 should also be large enough that seal mounting ring 22 provides an adequately tight tolerance with the upper crown 2a of the diffuser. Leakage between inlet mixer 4 and diffuser 2 is further prevented via expansion of the flexible metallic seal 24 such that upper lip 24b presses against upper portion 22a of the seal mounting ring 22, and lower lip 24a presses against internal step 2c of the diffuser 2. Because the flexible metallic seal 24 has an "E" shape, the lips 24a/24b are forced to flare out (i.e., the flexible metallic seal 24 is self-expanding/self-tightening) to allow the internal seal to conform to a range of gap sizes. The "E" shape also allows the lower and upper lips 24a/24b of the flexible metallic seal 24 to flare out further due to an internal pressure of fluids inside the diffuser, causing a tighter seal during greater internal pressure of an operating jet pump. Specifically, the internal pressure caused by flowing fluids in the operating jet pump assembly causes the upper lip 24a of the flexible metallic seal 24 to press against the upper portion 22a of the seal mounting ring. The internal pressure caused by the flowing fluids in the operating jet pump assembly also causes the lower lip 24b of the flexible metallic seal 24 to press against the diffuser internal step 2c of the diffuser. It is again noted that a "C" shaped flexible metallic seal 24 may alternatively be used, as a "C" shaped seal could also be provided with an upper and lower lip that also provides the self-expanding/self-tightening function.

It is also noted that if the slip joint internal seal 20 (shown in FIGS. 5 and 6) were to be installed upside down, the internal seal would still adequately function. Specifically, the upper portion 22a of the seal mounting ring would be capable of pressing against internal step 2c and the lower portion 22c of the seal mounting ring and/or the lower lip 24a of the flexible metallic seal would be capable of pressing against the lowest distal end 4b of the inlet mixer.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A jet pump slip joint internal seal, comprising:
    a substantially circular seal mounting ring with a cross-section including an upper portion projecting horizontally toward an epicenter of the seal mounting ring and a lower portion projecting vertically downward, a lower surface of the upper portion being about perpendicular to an inner surface of the lower portion,
    a flexible metallic seal inside the seal mounting ring, the lower surface of the upper portion and the inner surface of the lower portion of the seal mounting ring contacting the flexible metallic seal to retain the flexible metallic seal within the seal mounting ring.

2. The jet pump slip joint internal seal of claim 1, wherein the flexible metallic seal includes two distal-most ends, one of the distal-most ends being an upper lip that projects toward the center of the internal seal and contacts the lower surface of the upper portion of the seal mounting ring, and the other distal-most end being a lower lip that projects toward the center of the internal seal and projects below a lower surface of the lower portion of the seal mounting ring.

3. The jet pump slip joint internal seal of claim 2, wherein the flexible metallic seal has a cross-sectional E-shape.

4. The jet pump slip joint internal seal of claim 3, wherein the inner surface of the lower portion of the seal mounting ring has an inwardly projecting tooth that engages the E-shaped flexible metallic seal to hold the flexible metallic seal in place in the seal mounting ring.

5. The jet pump slip joint internal seal of claim 2, wherein the flexible metallic seal has a cross-sectional C-shape.

6. The jet pump slip joint internal seal of claim 2, wherein the upper and lower lips of the flexible metallic seal are flared out to make the flexible metallic seal self-expandable.

7. A jet pump slip joint internal seal installed in a Boiling Water Reactor (BWR) jet pump assembly, comprising:
    a diffuser of the jet pump assembly of the BWR, the diffuser having an upper crown with an internal step,
    an inlet mixer with a lowest distal end, the lowest distal end being located inside the upper crown of the diffuser and above the internal step, and
    the jet pump slip joint internal seal being located between the internal step and the lowest distal end of the inlet mixer, the jet pump slip joint internal seal including,
        a substantially circular seal mounting ring with a cross-section including an upper portion projecting horizontally toward an epicenter of the seal mounting ring and a lower portion projecting vertical downward, a lower surface of the upper portion being about perpendicular to an inner surface of the lower portion, and
        a flexible metallic seal inside the seal mounting ring, the lower surface of the upper portion and the inner surface of the lower portion of the seal mounting ring contacting the flexible metallic seal to retain the flexible metallic seal within the seal mounting ring.

8. The installed jet pump slip joint internal seal of claim 7, wherein the upper portion of the seal mounting ring is configured to project far enough inward that an upper surface of the upper portion contacts the lowest distal end of the inlet mixer.

9. A method of forming a jet pump slip joint internal seal, the method comprising;
    forming a substantially circular seal mounting ring with a cross-section including an upper portion projecting horizontally toward an epicenter of the seal mounting ring and a lower portion projecting vertically downward, a lower surface of the upper portion being about perpendicular to an inner surface of the lower portion, and
    forming a substantially circular flexible metallic seal and placing the flexible metallic seal in the seal mounting ring,
    retaining the flexible metallic seal within the seal mounting ring by contacting the flexible metallic seal against the lower surface of the upper portion and the inner surface of the lower portion of the seal mounting ring.

10. The method of claim 9, wherein the flexible metallic seal includes two distal-most ends, the method further comprising:
    forming one of the distal-most ends as an upper lip which projects toward the center of the internal seal and contacts a lower surface of the upper portion of the seal mounting ring, and
    forming the other of the distal-most ends as a lower lip which projects toward the center of the internal seal and projects below a lower surface of the lower portion of the seal mounting ring.

11. The method of claim 9, wherein the forming of the flexible metallic seal includes forming the flexible metallic seal in a cross-sectional E-shape.

12. The method of claim 11, wherein the forming of the seal mounting ring includes forming an inwardly projecting tooth on the inner surface of the lower portion of the seal mounting ring, the tooth being configured to engage the E-shaped flexible metallic seal to hold the flexible metallic seal in place in the seal mounting ring.

13. The method of claim 9, wherein the forming of the flexible metallic seal includes forming the flexible metallic seal in a cross-sectional C-shape.

14. A method of installing a jet pump slip joint internal seal in a Boiling Water Reactor (BWR) jet pump assembly, comprising:
    forming the internal seal by the following steps,
        forming a substantially circular seal mounting ring with a cross-section including an upper portion projecting horizontally toward an epicenter of the seal mounting ring and a lower portion projecting vertically downward, a lower surface of the upper portion being about perpendicular to an inner surface of the lower portion,
        forming a substantially circular flexible metallic seal and placing the flexible metallic seal in the seal mounting ring,
        retaining the flexible metallic seal within the seal mounting ring by contacting the flexible metallic seal against the lower surface of the upper portion and the inner surface of the lower portion of the seal mounting ring, and placing the internal seal on an internal step inside an upper crown of a diffuser of the jet pump assembly, an upper surface of the upper portion of the seal mounting ring contacting a lowest distal end of an inlet mixer of the jet pump assembly.

15. The method of claim 14, further comprising:
machining the internal step in the upper crown of the diffuser, if the internal step does not already exist in the diffuser.

16. The method of claim 14, the flexible metallic seal including two distal-most ends, wherein the forming of the flexible metallic seal further comprises:

forming one of the distal-most ends as an upper lip which projects toward the center of the internal seal and contacts a lower surface of the upper portion of the seal mounting ring, and forming the other of the distal-most ends as a lower lip which projects toward the center of the internal seal and projects below a lower surface of the lower portion of the seal mounting ring.

17. The method of claim 16, further comprising:

further forming the upper and lower lips of the flexible metallic seal by flaring out the upper and lower lips, operating the jet pump assembly to allow fluid to flow through the inlet mixer and the diffuser, and allowing the flexible metallic seal to expand due to an internal pressure created by the flowing fluid in the operating jet pump assembly, the expansion of the flexible metallic seal causing the upper lip of the flexible metallic seal to press against the upper portion of the seal mounting ring and causing the lower lip of the flexible metallic seal to press against the internal step of the diffuser.

* * * * *